United States Patent
Tsantilis

(10) Patent No.: US 8,458,683 B2
(45) Date of Patent: Jun. 4, 2013

(54) SYSTEM AND METHOD FOR PROVIDING EXTENDABLE ENUMERATIONS

(75) Inventor: Efstratios Tsantilis, Sinsheim (DE)

(73) Assignee: SAP AG, Walldorf (DE)

( * ) Notice: Subject to any disclaimer, the term of this patent is extended or adjusted under 35 U.S.C. 154(b) by 1125 days.

(21) Appl. No.: 12/249,281

(22) Filed: Oct. 10, 2008

(65) Prior Publication Data

US 2010/0088691 A1   Apr. 8, 2010

Related U.S. Application Data

(60) Provisional application No. 61/103,169, filed on Oct. 6, 2008.

(51) Int. Cl.
*G06F 9/45* (2006.01)

(52) U.S. Cl.
USPC .......................................... 717/159

(58) Field of Classification Search
None
See application file for complete search history.

(56) References Cited

U.S. PATENT DOCUMENTS

| | | | | |
|---|---|---|---|---|
| 2004/0049764 | A1* | 3/2004 | Bloch et al. | 717/116 |
| 2007/0027849 | A1* | 2/2007 | Meijer et al. | 707/3 |
| 2007/0276951 | A1* | 11/2007 | Riggs et al. | 709/229 |

OTHER PUBLICATIONS

Thomas Mueller, "Creating Java Enum Objects at Runtime", posted on Jul. 30, 2008, retrieved from http://www.theserverside.com/news/thread.tss?thread_id=50190 on Apr. 25, 2012.*
"c#—add values to enum" Sep. 10, 2008, retrived from http://stackoverflow.com/questions/55375/add-values-to-enum, on Apr. 25, 2012.*

* cited by examiner

*Primary Examiner* — Philip Wang
(74) *Attorney, Agent, or Firm* — Kenyon & Kenyon LLP

(57) ABSTRACT

A system and method are provided in which an enumerated type is extendable. In an embodiment, additional attributes are assigned to instances of a class, thus extending the enumerated type. The addition of values to an enumeration may depend upon the surrounding system environment and/or the calling application.

12 Claims, 2 Drawing Sheets

```
        <<Extendable Enumeration>>
              CE_TRAFFIC_LIGHT
 <<ReadOnly>> red : CE_TRAFFIC_LIGHT
 <<ReadOnly>> green : CE_TRAFFIC_LIGHT
 <<Static>> allLights
 text
 action
 icon <<Static>> initialization()
 <<Static>> addLight()
 <<Static>> getAllLights()
 getAction()
 getText()
 getIcon()
```

FIG. 1

SYSTEM AND METHOD FOR PROVIDING EXTENDABLE ENUMERATIONS

CROSS-REFERENCE TO RELATED APPLICATIONS

This Application claims priority to U.S. Provisional Application Ser. No. 61/103,169, filed Oct. 6, 2008.

BACKGROUND

Businesses rely on software applications which handle various functions, including managing resources such as employees, assets, and the like. However, for each business, sometimes modifications to the software application(s) are needed in order to provide a more meaningful solution and application for the company.

Modifications to the software application(s) depend largely upon the type of modification needed, and the surrounding system environment. In some cases, an enhancement of an existing software application is desired, without expending large resources to modify the application. Accordingly, there exists a need to provide a feasible solution to enhancing an existing software application.

Accordingly, there exists a need for a design time application that allows a user to handle the process objects, including related objects involving handling user data, authorizations, environment set ups, and other matters.

BRIEF DESCRIPTION OF THE DRAWINGS

FIG. 1 shows an example extendable enumeration according to an embodiment of the present invention.

DETAILED DESCRIPTION

Figure 2:
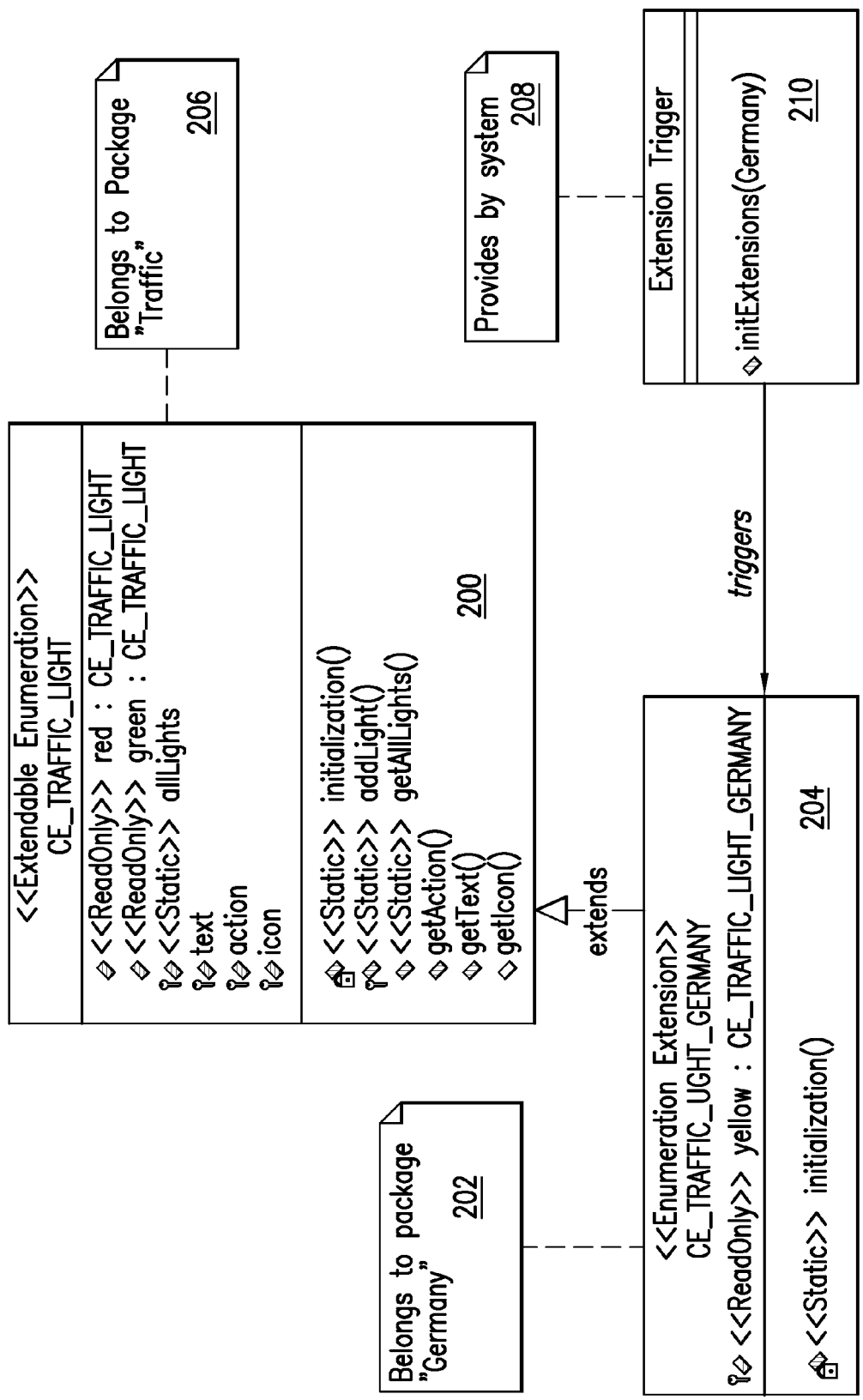
FIG. 2 shows an example class diagram involving an extendable enumeration according to an embodiment of the present invention.

Embodiments of the present invention provide a system and method for modification—free enhancement of one or more software components with respect to enumerations. In embodiments of the present invention, extendable enumerations enable central software components.

Enumerations, or an enumerated type, is an abstract data type whose set of possible values is a finite list of identifiers chosen by a programmer. In some cases, enumerations are used instead of classic constants. This is because of the enumerations' data type secureness and to make source code more self-documenting.

An enumerated type is a data type used to model an attribute that has a specific number of options or identifiers, e.g., the suit of a playing card in which the options are limited to Club, Diamond, Heart, and Spade, or the colors of a traffic light in which the options are limited to red, yellow, and green. Some databases support enumerated types directly. For example, MySQL provides an enumerated type with allowable values specified as strings when a table is created. For example, the values are stored as numeric indices with the empty string stored as 0, the first string stored as 1, the second string stored as 2, and so on. Values can be stored and retrieved as numerical indexes or string values.

In available programming languages, an enumeration may differ somewhat in its representation. In the ABAP language, for example, an enumeration may be represented by a class with a specific inner structure.

FIG. 1 shows an example extendable enumeration. For example, the class CE_TRAFFIC_LIGHT represents an enumeration implementation in the ABAP language. As shown in FIG. 1, the class CE_TRAFFIC_LIGHT has assigned attribute values of RED and GREEN. According to FIG. 1, these attribute values are static or read-only attributes of the class. In fact, RED and GREEN are instances of the class CE_TRAFFIC_LIGHT. The instances for RED and GREEN are created within a static initialization of the class, as shown, for example, in FIG. 1, which in ABAP is represented by the CLASS_CONSTRUCTOR method.

In FIG. 1, enumerations also are used to assign certain properties to each value. The attributes of text, action and icon, are assigned to the values of RED and GREEN, respectively. This assignment is provided by corresponding get methods, e.g., getAction( ), getText( ), and getIcon( ). Thus, the enumeration is assigned to be "extendable," in accordance with the present invention.

In embodiments, extendable enumerations may have an explicit extension option. That is, it may be useful and/or necessary to add additional values to the enumeration. This addition of values to the enumeration may depend upon the surrounding system environment and/or the calling application.

In FIG. 1, for example, it may be desired and/or useful to extend the enumeration by a value yellow. In this example, the value yellow is determined to be only relevant for certain countries, e.g., Germany. In a further embodiment, the attribute get_icon may be modified and adapted to the local settings in Germany.

In an embodiment, an extension may be realized by an inheritance of an enumeration. For example, the extension may be realized by an inheritance of the enumeration CE_TRAFFIC_LIGHT to CE_TRAFFIC_LIGHT_GERMANY. See, for illustration, FIG. 2. FIG. 2 shows an example class diagram for the class CE_TRAFFIC_LIGHT. The class CE_TRAFFIC_LIGHT has been typed as an extendable enumeration 200. In this example, the class may be implemented as a derivation of the super-extension. For example, during an initialization method, the enumeration extension may assign a new instance "yellow" to the enumeration. The enumeration extension may also modify the value of attribute of the icon for RED and GREEN. For example, in FIG. 2, the extension is possible by setting the enumeration to "protected" and providing the protected static method addLight which enables extensions to add new items to the enumeration. In FIG. 2, a trigger now calls the method initialization of CE_TRAFFIC_LIGHT_GERMANY.

Embodiments of the present invention accommodate multiple sets of enumeration extensions that may operate in parallel. In the traffic light example provided in FIG. 2, multiple enumeration extensions (not shown) may be defined on a country-by-country basis. The enumeration extensions might be aggregated in an application where system processes are performed on a larger array of data (e.g., for all of Europe, North America, etc.).

In an embodiment of the present invention, a surrounding environment or system supporting an extendable enumeration may assign an attribute "extendable" to an enumeration's definition. In an embodiment, a system supporting an extendable enumeration defines enumerations as extensions of a super enumeration. In an embodiment, a system supporting an extendable enumeration defined an initialization method that is called by an "extension trigger" or the like. In an embodiment, a system supporting an extendable enumeration assigns an extension trigger to the extension's initialization by enabling a direct activation of the surrounding application.

In an embodiment, a system supporting an extendable enumeration assigns an extension trigger to the extension's initialization by assigning the extension to an "enhancement switch" or the like. In this embodiment, the extension may also be activated during compilation time. In another embodiment, an extension may be activated during run time as when, for example, an application makes explicit reference to an extended enumeration value or instance. In one embodiment, computer instructions for supporting an extendable enumeration as described above may be embodied in a computer-readable medium.

In an embodiment, in the ABAP environment, extendable enumerations may be a future alternative for system-table-based configuration and append concepts for domain-values. In the present invention, the enhancements may be effected by an ADD-ON or other component in any given system supporting extendable enumerations.

It should be understood that there exist implementations of other variations and modifications of the invention and its various aspects, as may be readily apparent to those of ordinary skill in the art, and that the invention is not limited by specific embodiments described herein. Features and embodiments described above may be combined with and without each other. It is therefore contemplated to cover any and all modifications, variations, combinations or equivalents that fall within the scope of the basic underlying principals disclosed and claimed herein.

What is claimed is:

1. A method for enhancing software applications, comprising:
    providing, by a computer processor, a software application, the software application including a class assigned as extendable to represent an enumerated data type;
    defining, by the computer processor, an extension class derived from the class assigned as extendable, the extension class inheriting all enumerated values for the enumerated data type and adding a new value to the enumerated data type; and
    defining, by the computer processor, an initialization method that is to be called by an extension trigger, wherein the initialization method instantiates a new instance of the extension class with the new value after being invoked.

2. The method of claim 1, wherein the new value is only relevant for specific settings and an attribute of the extension class is modified for the specific settings.

3. The method of claim 2, wherein the enumerated data type is extendable by an inheritance of an enumeration.

4. The method of claim 1, wherein the enumerated data type is set as protected.

5. A system for enhancing a software application, comprising:
    a computer processor, configured to execute computer instructions to:
        provide a software application, the software application including a class assigned as extendable to represent an enumerated data type;
        define an extension class derived from the class assigned as extendable, the extension class inheriting all enumerated values for the enumerated data type and adding a new value to the enumerated data type; and
        define an initialization method that is to be called by an extension trigger, wherein the initialization method instantiates a new instance of the extension class with the new value after being invoked.

6. The system of claim 5, wherein the new value is only relevant for specific settings and an attribute of the extension class is modified for the specific settings.

7. The system of claim 5, wherein the enumerated data type is extendable by an inheritance of an enumeration.

8. The system of claim 5, wherein the enumerated data type is set as protected.

9. A computer-readable medium including instructions adapted to execute a method for enhancing software applications, the method comprising:
    providing a software application, the software application including a class assigned as extendable to represent an enumerated data type;
    defining, by the computer processor, an extension class derived from the class assigned as extendable, the extension class inheriting all enumerated values for the enumerated data type and adding a new value to the enumerated data type; and
    defining, by the computer processor, an initialization method that is to be called by an extension trigger, wherein the initialization method instantiates a new instance of the extension class with the new value after being invoked.

10. The computer-readable medium of claim 9, wherein the new value is only relevant for specific settings and an attribute of the extension class is modified for the specific settings.

11. The computer-readable medium of claim 9, wherein the enumerated data type is extendable by an inheritance of an enumeration.

12. The computer-readable medium of claim 9, wherein the enumerated data type is set as protected.

* * * * *